United States Patent [19]

Yoshitake et al.

[11] Patent Number: 5,249,273
[45] Date of Patent: Sep. 28, 1993

[54] MICROPROCESSOR HAVING A VARIABLE LENGTH INSTRUCTION FORMAT

[75] Inventors: Akihiro Yoshitake; Toshiharu Ohshima, both of Kawasaki, Japan

[73] Assignee: Fujitsu Limited, Kanagawa, Japan

[21] Appl. No.: 499,432

[22] PCT Filed: Jan. 12, 1990

[86] PCT No.: PCT/JP90/00034

§ 371 Date: Jun. 22, 1990

§ 102(e) Date: Jun. 22, 1990

[87] PCT Pub. No.: WO90/08355

PCT Pub. Date: Jul. 26, 1990

[30] Foreign Application Priority Data

Jan. 17, 1989 [JP] Japan ................. 1-8124

[51] Int. Cl.[5] .......................... G06F 9/06; G06F 9/34
[52] U.S. Cl. .................... 395/375; 364/231.8; 364/259.9; 364/262.8; 364/DIG. 1
[58] Field of Search .................. 395/375, 775

[56] References Cited

U.S. PATENT DOCUMENTS

| 3,566,366 | 2/1971 | Quinn et al. | 395/375 |
| 4,188,669 | 2/1980 | Rausher | 395/375 |
| 4,240,142 | 12/1980 | Blahut et al. | 395/375 |
| 4,241,397 | 12/1980 | Strecker et al. | 395/375 |
| 4,258,419 | 3/1981 | Blahut et al. | 395/375 |
| 4,293,907 | 10/1981 | Huang et al. | 395/375 |
| 4,454,578 | 6/1984 | Matsumoto et al. | 395/375 |
| 4,530,050 | 7/1985 | Fukunaga et al. | 395/375 |
| 4,785,393 | 11/1988 | Chu et al. | 395/375 |
| 4,967,326 | 10/1990 | May | 395/375 |

FOREIGN PATENT DOCUMENTS

57-161943 10/1982 Japan .
1-237837 9/1989 Japan .
WO86/00435 1/1986 World Int. Prop. O. .

OTHER PUBLICATIONS

Patent Abstracts of Japan, vol. 12, No. 329 (P-754)[3176], Sep. 7, 1988; and JP-A-63 91 739 (Matsushita Electric Ind. Co., Ltd), Apr. 22, 1988.

Systems and Computers in Japan, vol. 16, No. 3, May–Jun. 1985, pp. 19–28, Washington, D.C., USA; H. Matsumoto et al.: "A High-Performance Architecture for Variable Length Instructions", (Entire Document).

Primary Examiner—Parshotam S. Lall
Assistant Examiner—Ayni Mohamed
Attorney, Agent, or Firm—Nikaido, Marmelstein, Murray & Oram

[57] ABSTRACT

Microprocessor for executing variable length instructions including the basic areas having the instruction code and operand designation area with the extensible area to be added in accordance with designation of the basic areas for extending the operand designation areas. It includes a basic area decoder for identifying the existence or non-existence of the successive basic areas and extensible areas and for outputting the basic areas transition request or extensible area transition request by decoding the basic area, an extensible area decoder for identifying the existence or non-existence of the continuation of the extensible areas and for outputting an extensible area continuation request by decoding the extensible area, and a decoder sequencer for controlling the two decoders in accordance with a predetermined sequence. The sequencer comprises a first control circuit for generating a control signal for the basic area decoder responding to the basic area transition request, a second control circuit for generating a control signal for the extensible area decoder responding to the extensible area transition request or the extensible area continuation request and a third control circuit connected to the first and second control circuits for delaying operations of the first control circuit corresponding to the basic area transition request in case the extensible transition request or extensible area continuation request is issued.

9 Claims, 10 Drawing Sheets

Fig.2

| CLASSIFICATION | | INSTRUCTION FORMAT |
|---|---|---|
| ORDINARY TYPE | ONE OPERAND | OP ¦S¦ OPERAND DESIGNATION AREA ¦ EXTENSIBLE AREA (15 / 16*n) |
| | TWO OPERANDS | OP ¦S¦ OPERAND DESIGNATION AREA ¦ EXTENSIBLE AREA (15 / 16*n)<br>OP ¦S¦ OPERAND DESIGNATION AREA ¦ EXTENSIBLE AREA (15 / 16*n) |
| | EXTENSIBLE OPERAND | OP ¦S¦ OPERAND DESIGNATION AREA ¦ EXTENSIBLE AREA (15 / 16*n)<br>OP ¦S¦ OPERAND DESIGNATION AREA ¦ EXTENSIBLE AREA (15 / 16*n)<br>R ¦ #1 OR DISP ¦ EXTENSIBLE AREA (15) |
| REDUCTION TYPE | BETWEEN MEMORY AND REGISTER | OP¦R¦S¦ OP ¦ OPERAND DESIGNATION AREA ¦ EXTENSIBLE AREA (15 / 16*n)<br>OP¦R¦ OP ¦ OPERAND DESIGNATION AREA ¦ EXTENSIBLE AREA (15 / 16*n) |
| | BETWEEN REGISTERS | OP¦Ra¦ OP ¦Rb (15) |

Fig.8

MOV: G      (DISP, Rn), Rm

| OP1 | S1 | EA1 | ADDITIONAL MODE | OP2 | S2 | EA2 |
|-----|----|----|-----------------|-----|----|----|

| | | | | | |
|---|---|---|---|---|---|
| CURRENT STAGE (BASIC) | SG1 | SG1 | SG2 | SG2 | SG1 |
| (EXTENSIBLE) | — | ADDM | — | — | — |
| NEXT STAGE (BASIC) | SG2 | SG2 | SG1 | SG1 | |
| (EXTENSIBLE) | ADDM | — | — | — | |
| DECODE OPERATION | OP1 | ADDM | OP2W WAIT REQUEST | OP2 | |

Fig.9

MICROPROCESSOR HAVING A VARIABLE LENGTH INSTRUCTION FORMAT

FIELD OF THE INVENTION

The present invention relates to a microprocessor having employed a variable length instruction format and particularly to a microprocessor comprising an improved decode sequencer for controlling the decoding sequence of each part of a variable length instruction wherein a single instruction is composed of a plurality of basic areas and extensible areas in the variable length.

BACKGROUND OF THE INVENTION

FIG. 1 is a conceptional diagram of the variable length instruction format. This FIG. 1 indicates that an instruction for the microprocessor is formed by the N areas in maximum. Such an instruction is decoded in a plurality of cycles. The basic area of each part includes an instruction code and the extensible area includes an immediate data. For instance, existence of successive extensible areas and significance of the basic area of the second part are defined on the basis of 16 bits and is located immediately after the operand designation area to extend the operand designation area. The extensible area includes an information for indicating the existence or non-existence of the successive extensible areas. 16*n (n is an integer including 0) indicates that the length of the extensible area is variable in units of 16 bits. In the case of a reduction type, the bit length of the ordinary type operand designation area is reduced by two bits in order to improve execution speed. In such a variable length instruction format, an instruction having a high frequency of use is assigned on the basis of one operand and an instruction having a low frequency of use is assigned on the basis of two or more operands. Thereby, the instructions having a high frequency of use are executed within a short period of time and a kind of instruction can also be increased. An example of such variable length instructions is shown in FIG. 3A to FIG. 3C.

FIG. 3A, FIG. 3B indicate examples of the instruction with two operands format and FIG. 3C indicates an example of the instructions with a one operand format. FIG. 3A indicates an ordinary type instruction of two operands having the effective address field of 8 bits. In this case, the first basic area of 16 bits comprises an instruction code OP, a source operand size SS and a source.operand.effective address eas, while the second basic area comprises an instruction code OP, a destination.operand.size DD and destination.operand.effective address ead. Here, exp 16/32 indicates an extensible area of 16 bits or 32 bits. FIG. 3B indicates an 8 bit.immediate type instruction. The first basic area comprises an instruction code OP and an immediate data #, while the second basic area comprises an instruction code, a destination.operand.size DD and a destination.operand. effective address ead. In this instruction, the extensible area exp 16/32 is added only to the second basic area. FIG. 3C indicates a reduction type instruction to be transferred between the register and memory, comprising the basic area consisting of an instruction code OP, a register designation area $R_n$, a source.operand.size SS, a source.operand.effective address or a destination.operand.effective address eas/ead and the extensible area exp 16/32.

As the decoding sequence of such a variable length instruction, a stage transition shown in FIG. 4 can be considered. FIG. 4 shows a stage transition diagram of decoding for the instruction comprising three basic areas in maximum. The circle indicates the decoding stage of each area, while the arrow mark indicates the state transition to the other decoding stage. In case the instructions having only the first basic area continues, it is enough to repeat only the decoding stage for the first basic area, but in case an instruction comprises the second and third basic areas and the first, second and third extensible areas, the decoding sequence is complicated for the trial of decoding in the successive stages by simply making reference to the preceding decoding stage because the significance of the instruction code of the successive basic areas changes and the length of the extensible area is also variable due to the instruction code of the first basic area.

For instance, for the decoding of the instruction shown in FIG. 1, the first basic area is decoded and it is decided from the result of decoding that the first extensible area is present. Next, the first extensible area is decoded and when it is decided, as a result of decoding, that the extensible area continues, the decoding process for the first extensible area is repeated. When the decoding of the first extensible area is completed and it is decided, as a result of decoding for the first basic area, that the second basic area is used, the processing transits to the decoding stage of the second basic area. When the second basic area is decoded and it is decided, from the result of decoding for the second basic area, that the second extensible area is used, the processing transits to the decoding stage of the second extensible area. Thereafter, when it is decided, from the result of decoding for the second basic area, that the third basic area is used, the processing transits to the decoding stage of the third basic area. When it is decided, from the result of decoding for the third basic area, that the third extensible area is used, the third extensible area is decoded. When it is decided, from the result of decoding for the third basic area, that the third extensible area and the fourth extensible area are not used, the processing shifts to the next instruction and the decoding is carried out in a decode sequence similar to that explained above. However, such a decoding sequence will be required for shifting to the decoding of the next basic area upon completion of the decoding of each extensible area to confirm that the extensible area in question is associated with which basic area and know the result of decoding of such a basic area. The more the state transition exists, the more the control signal for indicating the transition is necessary. Therefore, the decoding sequencer for stage transition shown in FIG. 4 presents a problem in that the circuit structure is more complicated. This problem becomes more serious as the number of basic areas and extensible areas forming the one instruction increases. In addition, complicated decoding sequencer makes the required time longer for decoding.

DISCLOSURE OF THE INVENTION

It is an object of the present invention to provide a microprocessor which effectively realizes decoding of the variable length instructions and also comprises an instruction decoder in a simplified structure.

It is another object of the present invention to provide a microprocessor comprising an instruction decoder which realizes decoding of variable length instructions at a high speed.

It is further object of the present invention to provide a microprocessor which is suitable for high packing density.

These objects may be achieved by a microprocessor for executing the variable length instructions including the basic area providing the instruction code and operand designation area and the extensible area which is added depending on designation by the basic area in order to extend the operand designation area. The device includes a basic area decoder which decides the existence or not of the successive basic areas and extensible areas and outputs the basic area transition request or extensible area transition request by decoding the basic area. An extensible area decoder decides the existence or not of the successive extensible areas and outputs an extensible area continuation request by decoding the extensible area. A decode sequencer generates a control signal for designating the decoding to the basic area decoder and extensible area decoder depending on the predetermined sequence. The decode sequencer comprises a first control circuit which generates a control signal for the basic area decoder responding to the basic area transition request, a second control circuit which generates a control signal for the extensible area decoder responding to the extensible area transition request or extensible area continuation request, and a third control circuit which is connected to the first control circuit and second control circuit to hold the operations of the first control circuit corresponding to the basic area transition request when the extensible area transition request or extensible area continuation request is issued.

BRIEF DESCRIPTION OF THE DRAWINGS

FIG. 2 is a conceptonal diagram indicating an instruction format which may be varied up to an instruction having three basic areas;

FIG. 8 is an instruction format of MOV instruction.

FIG. 9 is a stage transition diagram for decoding of the MOV instruction by an embodiment of the present invention;

A PREFERRED EMBODIMENT OF THE INVENTION

Figure 5:
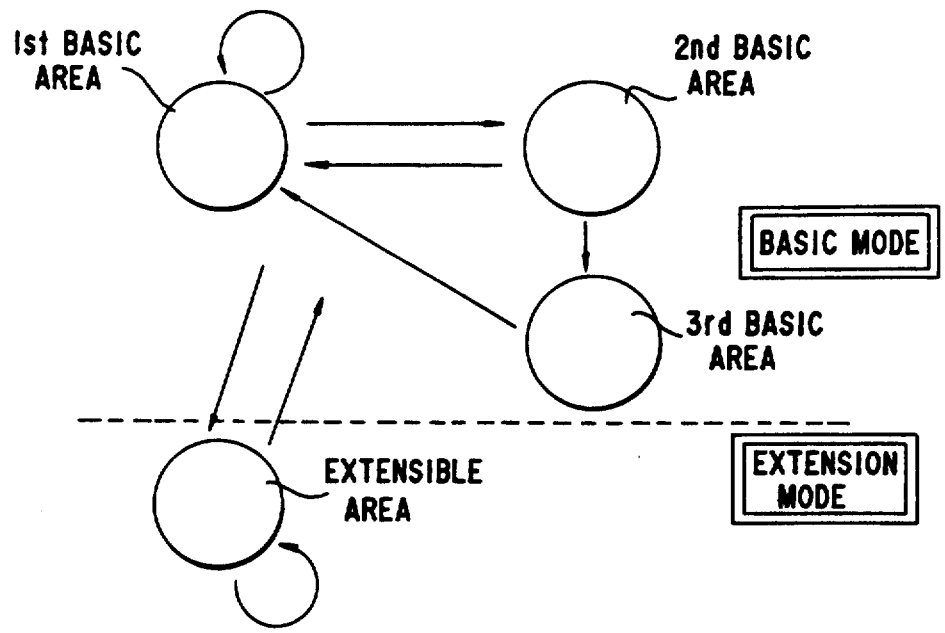
FIG. 5 is a stage transition diagram of an instruction decoding as an embodiment of the present invention.

The stage transition of instruction decoding in an embodiment of the present invention is explained by referring to FIG. 5. In this figure, a circle indicates a decoding stage and an arrow mark indicates a transition of decoding stage.

Figure 1:
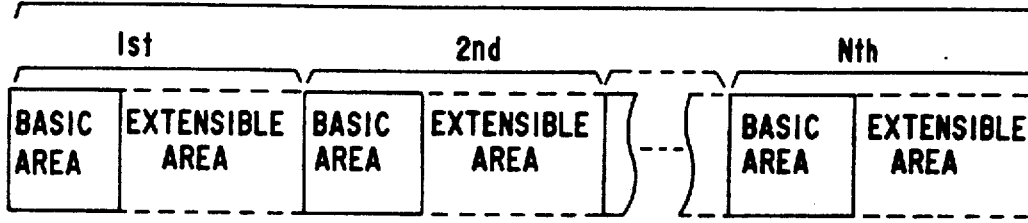
FIG. 1 is a conceptional diagram of a variable length instruction.
Figure 3A:
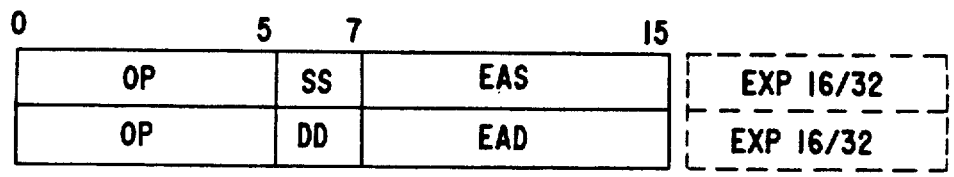
FIG. 3A, FIG. 3B are conceptional diagrams indicating an instruction of ordinary format having two operands.
Figure 3B:
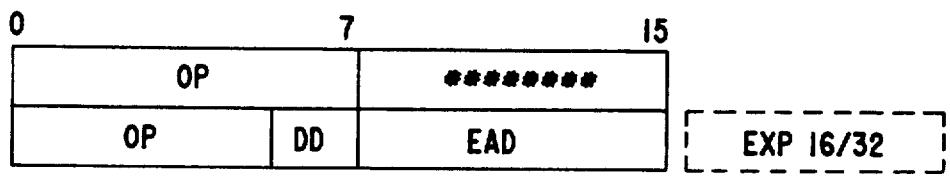
Figure 3C:
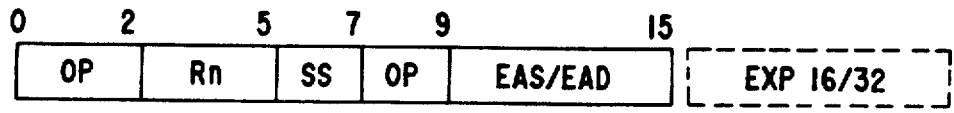
FIG. 3C is a conceptional diagram indicating a reduction type instruction to be transferred between a register and a memory.
Figure 4:
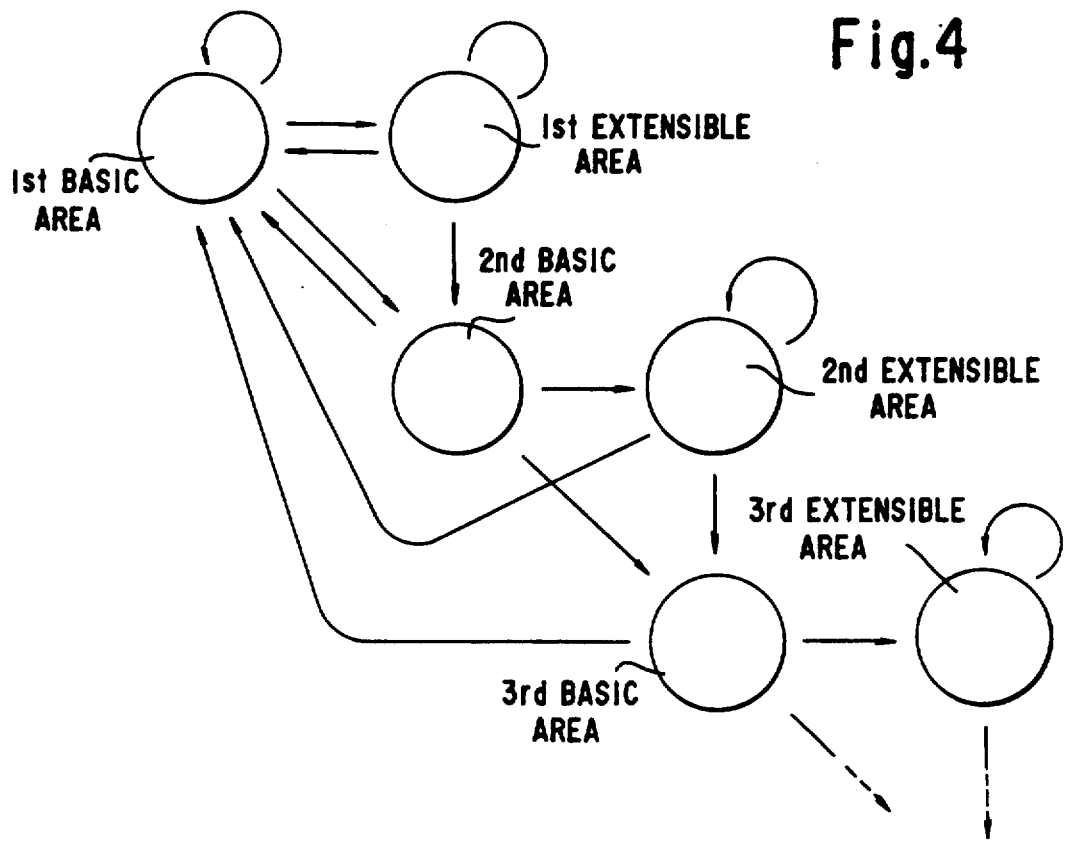
FIG. 4 is a stage transition diagram.

In the present invention, the decode stage is classified into the basic mode and extension mode to separate the decode stages of the basic area and extensible area. Moreover, as shown in FIG. 4, the decode stages of the first, second and third extensible areas are not classified and the decode stages of each extensible area are used in common. As a result, the kinds of state transitions of the decode stage are reduced in an embodiment of the present invention shown in FIG. 5 and simplification of the decode sequencer can be realized, in comparison with FIG. 4.

In this embodiment, when the extensible area is not used in the instruction or when the data, control signal required for the operand process within the same decode cycle as the basic area may be prepared even in case the extensible area is used, the decode stage transits only within the basic mode. In case the instructions comprising only the first basic area continue, only the decode stage of the first basic area is repeated. Moreover, in the case of the instruction comprising the basic areas up to the third basic area, the decode stage transits in the sequence of the first basic area, second basic area and third basic area and thereafter the decode stage transits to the first basic area for the decoding of the next instruction. Meanwhile, it is decided that the second basic area is used and the first extensible area is also used and in case the data, control signal required for the process within the same decode cycle as the basic area cannot be prepared (for instance, the immediate data length designated by the operand designation area is too long to fetch within the one cycle), the transition request to the second basic area is queued in the holding condition and the successive extensible areas are decoded after transition to the extension mode. When it is decided that the successive extensible area continues as a result of decoding of the successive extensible areas, the decode stage of the extensible area is repeated. The same processings are carried out for the second and third extensible areas. When it is decided that the successive extensible areas are not used, the operation mode returns again to the basic mode and transits to the decode stage of the second basic area in the queuing condition.

Figure 6:
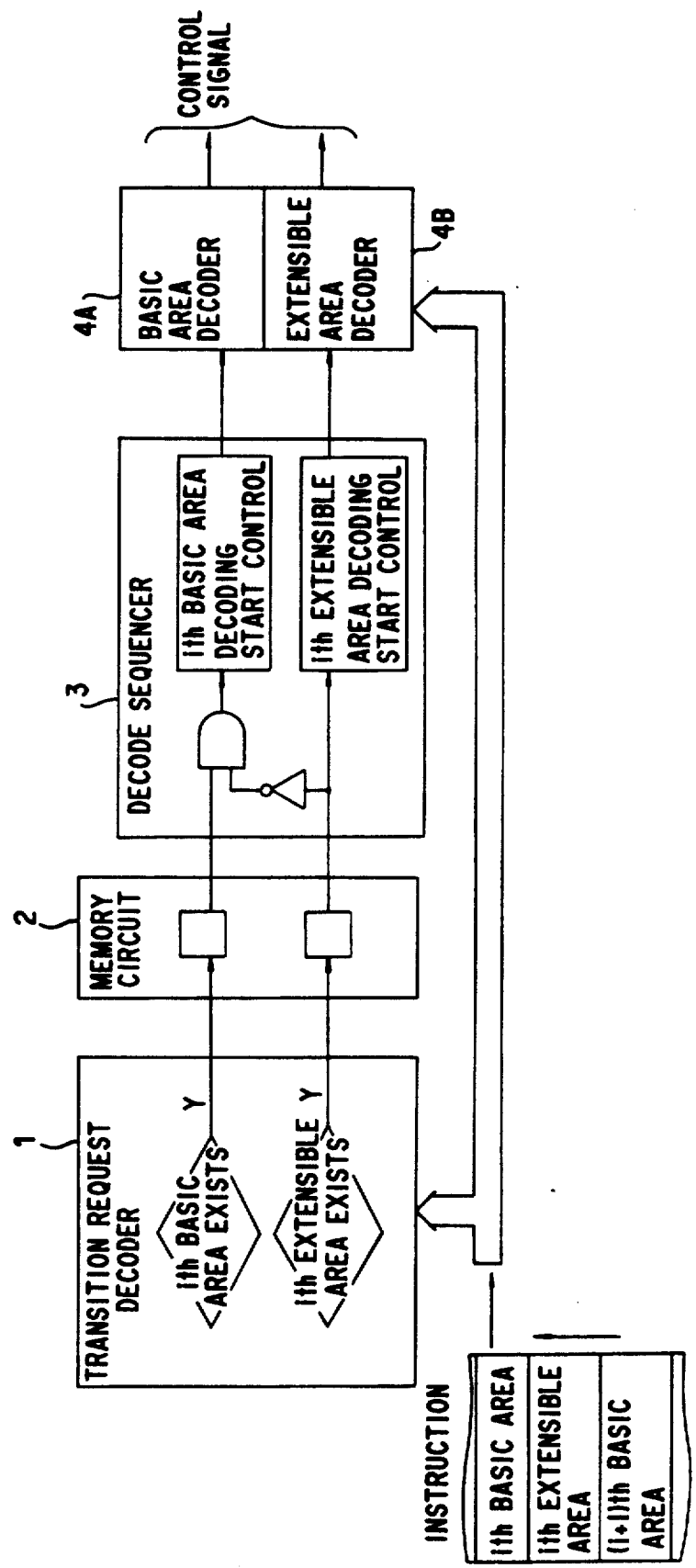
FIG. 6 is a block diagram of an essential portion of an instruction decoder as an embodiment of the present invention.

The stage transition shown in FIG. 5 may be realized by providing the instruction decoder shown in FIG. 6. FIG. 6 indicates a structure of the principle of the present invention. An instruction as the decoding object is a variable length instruction, as shown in FIG. 1, FIG. 2 and FIGS. 3A-3C, comprising the basic area in the predetermined bit length, an extensible area in the length of an integer times of the predetermined bit length designated by the basic area and the basic area depending on the preceding basic area.

In FIG. 6, the reference numeral 1 designates a transition request decoder which reads sequentially the instruction from the leading area in every processing unit bit length and decides the existence or not non-existence of the successive basic areas and extensible areas. The numeral 2 designates a memory circuit such as a latch circuit which tentatively stores the signal indicating existence or non-existence of the basic areas and extensible areas. The numeral 3 designates a decode sequencer which sequentially outputs the signal for stating the decoding of the basic area and extensible area corresponding to the data held in the storage circuit 2 to the basic area decoder 4A or extensible area decoder 4B. In this case, the decode sequencer 3 masks the request for decoding the successive basic area and preferentially outputs the signal for starting the decoding of the extensible area in case the signal for starting the decoding of the basic area and the signal for starting the decoding of the extensible area appear concurrently.

In case the next basic area is decoded after completion of decoding of the extensible area, since the information indicating existence of the basic area is held within the memory circuit 2, if the extensible area is preferentially decoded by such preferential control, the control for starting the decoding of the successive basic areas can be commenced easily. Combination of the preferential controls of this memory circuit 2 and decode sequencer 3 simplifies the structure of decode sequencer compared to the prior art.

Figure 7:
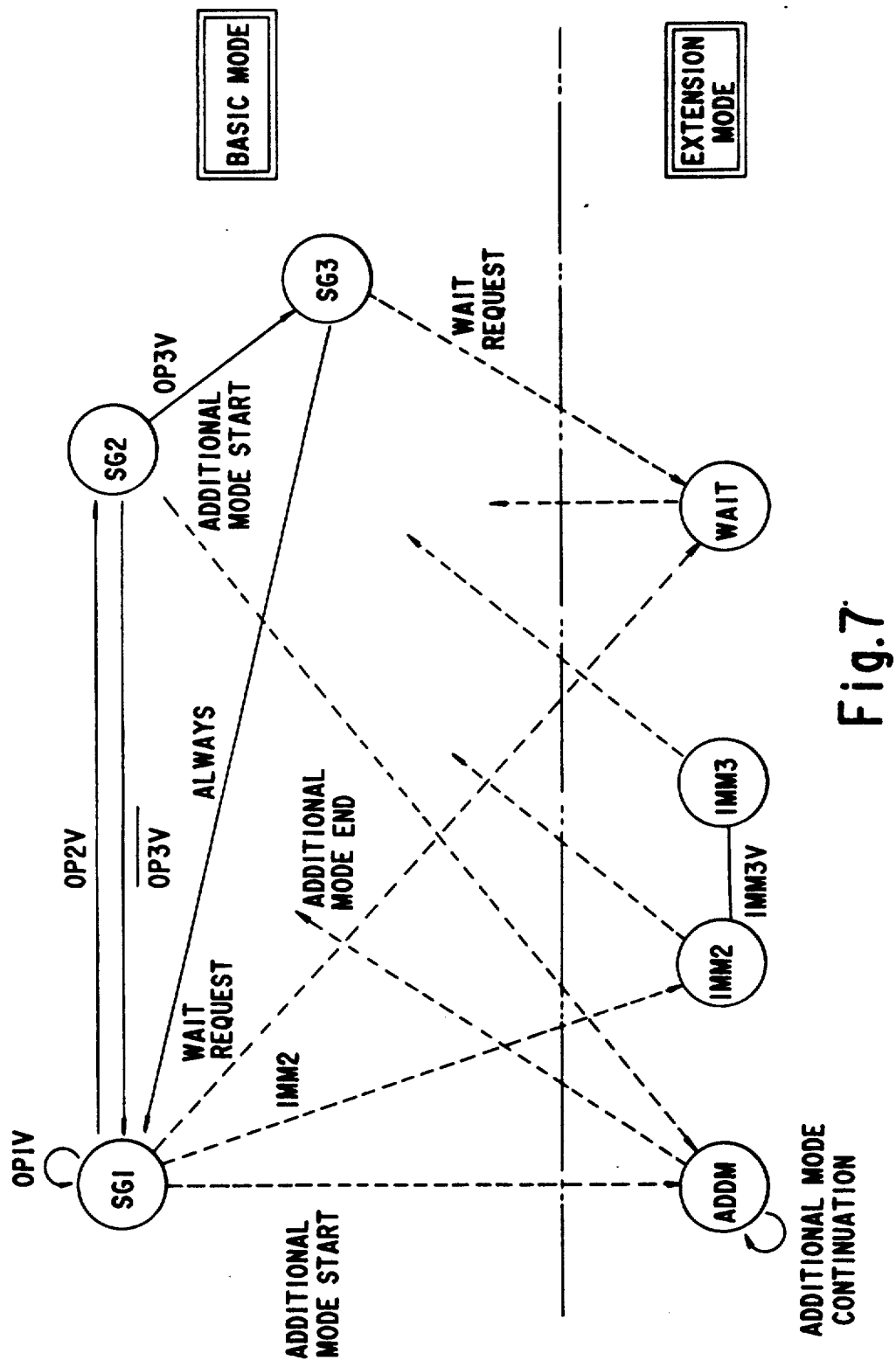
FIG. 7 is a stage transition diagram of instruction decoding as an embodiment of the present invention.

FIG. 7 is a stage transition diagram indicating an example of the decode sequence as an embodiment of the present invention.

The decode sequence of this embodiment is capable of taking the following seven stages:

Basic mode

The stage transition occurs when the operation code of the preceding basic area further requires the successive operation codes.

SG1: Stage for executing the decoding from the leading area (OP1), namely from the first basic area
SG2: Stage for executing the decoding from the second basic area (OP2) of the instruction
SG3: Stage for executing the decoding from the third basic area (OP3) of the instruction Extension mode In case the data, control signal required for designated operand processing cannot be prepared within the decode cycle of the basic area in the basic mode, the processing transits to this mode from the basic mode.
ADDM: Decode stage of additional mode
IMM2: Stage for extracting the second word of the immediate data of long data
IMM3: Stage for extracting the third word of the immediate data of long data
WAIT: Stage for setting the decoding of two cycles for synchronization in case the successive circuit requires operations of two cycles for the decoding of one cycle The transition request to each stage is as follow.
SG1REQ: Request for decoding of the first basic area (this request is issued repeatedly when the instruction comprising only the first basic area continues)
SG2REQ: Request for decoding of the second basic area
SG3REQ: Request for decoding of the third basic area
ADDMREQ: Request for transition to the additional mode
IMM2REQ: Request for transition issued when there is the immediate data of a second word
IMM3REQ: Request for transition issued when there is the immediate data of a third word
WAIT: Request for wait The arrow mark indicated by a broken line directed to the basic mode from the ADDM stage, IMM2 stage, IMM3 stage, WAIT stage shows transition to the corresponding stage among SG1 SG3 depending on the preceding basic areas.

The basic stage transition of an embodiment of the present invention is similar to that in FIG. 5. The difference is that the stage in the extension mode is indicated in more detail. Here, the additional mode means the extension mode of operand designation area in the addressing mode in which the multiple indirect addressing and scaling are available. The transition during the fetching of the long immediate data is as follow. When the decoding result of the first basic area in the SG1 stage suggests that the long immediate data of second or third word exists, the sequence transits to the IMM2 stage. In addition, when the decoding result of the first basic area suggests that the long immediate data of third word exists, the sequence transits to the IMM3 stage. Moreover, the transition request SG3REQ to SG3 stage from SG1 stage is issued when it is decided that the third basic area exists while the first basic area and the second basic area are decoded simultaneously. Here, the wait request WAIT REQ is generated in the SG1, SG3 stages.

For example, the MOV instruction shown in FIG. 8 is decoded as explained below by the decode sequence shown in FIG. 7. FIG. 8 indicates a format of instruction conforming to the TRON (The Realtime Operating system Nucleus) specification. This MOV instruction is a memory-to-memory transfer instruction and is expressed as follow in the mnemonic.

MOV : G @@ (disp, Rn), @Rm

Where, MOV indicates a transfer instruction; G, the instruction is an ordinary type instruction shown in FIG. 2; @, indirect addressing; @@, double indirect addressing; disp, displacement; Rn, Rm, index registers. In the EA1 area, a code indicating that the next first extensible area is the additional mode is stored, while in the EA2 area, an identification code indirect addressing of Rm is stored and in the first extensible area, a code indicating the double indirect addressing by Rn and displacement value is stored as the additional mode. Namely, in the case of above instruction, the operand address is extracted by making access to the memory with the address value obtained by adding displacement disp to a value within the index register Rn. The source data is accessed on the basis of the operand address and it is then transferred to the address corresponding to a value in the index register Rm.

OP1, S1, EA1 in the instruction are first basic areas, while the successive additional mode area is the first extensible area. OP2, S2, EA2 are second basic areas. OP1 has the information indicating that the second basic area exists, while EA1 has the information indicating that the first extensible area exists. The first extensible area (additional mode) belongs to the first basic area designated by OP1. S1, S2 are operand sizes.

The stage transition on the occasion of decoding the MOV instruction based on the decode sequence of the present invention is shown in FIG. 9. The lateral direction of FIG. 9 indicates the time axis, indicating the current stage in every cycle, the next stage identified on the basis of the decode result in the current stage and the decode operation in such a cycle.

Since the MOV instruction has a format of the first basic area + extensible area (additional mode) + second basic area, it can be understood that the SG2 stage, ADDM stage are requested as the next stage by decoding OP1 in the SG1 stage. Since the ADDM stage corresponds to the first extensible area, transition to the SG2 stage is frozen and the sequence is transferred to the ADDM stage in the next cycle. In this case, since the length of the extensible area is set enough to be processed in one cycle, the sequence is transferred to the SG2 stage in the next cycle. However, since the WAIT request is issued, decoding of OP1 is queued for one cycle (indicated by OP2W) and the current stage is held as the SG2 stage. In the next cycle, OP2 is decoded. Since the MOV instruction includes the basic areas up to the second basic areas, the next stage is the SG1 stage.

In the case of the instruction such as MOV: G @ (disp, Rn), @Rm (access to the memory is made with the address having a value obtained by adding displacement disp to the value of register Rn and the data of such address is transferred to the address having the value of register Rm), transition to the extension mode does not occur because displacement disp can be prepared in the decode cycle of the basic area even when the extensible area exists.

Figure 10:
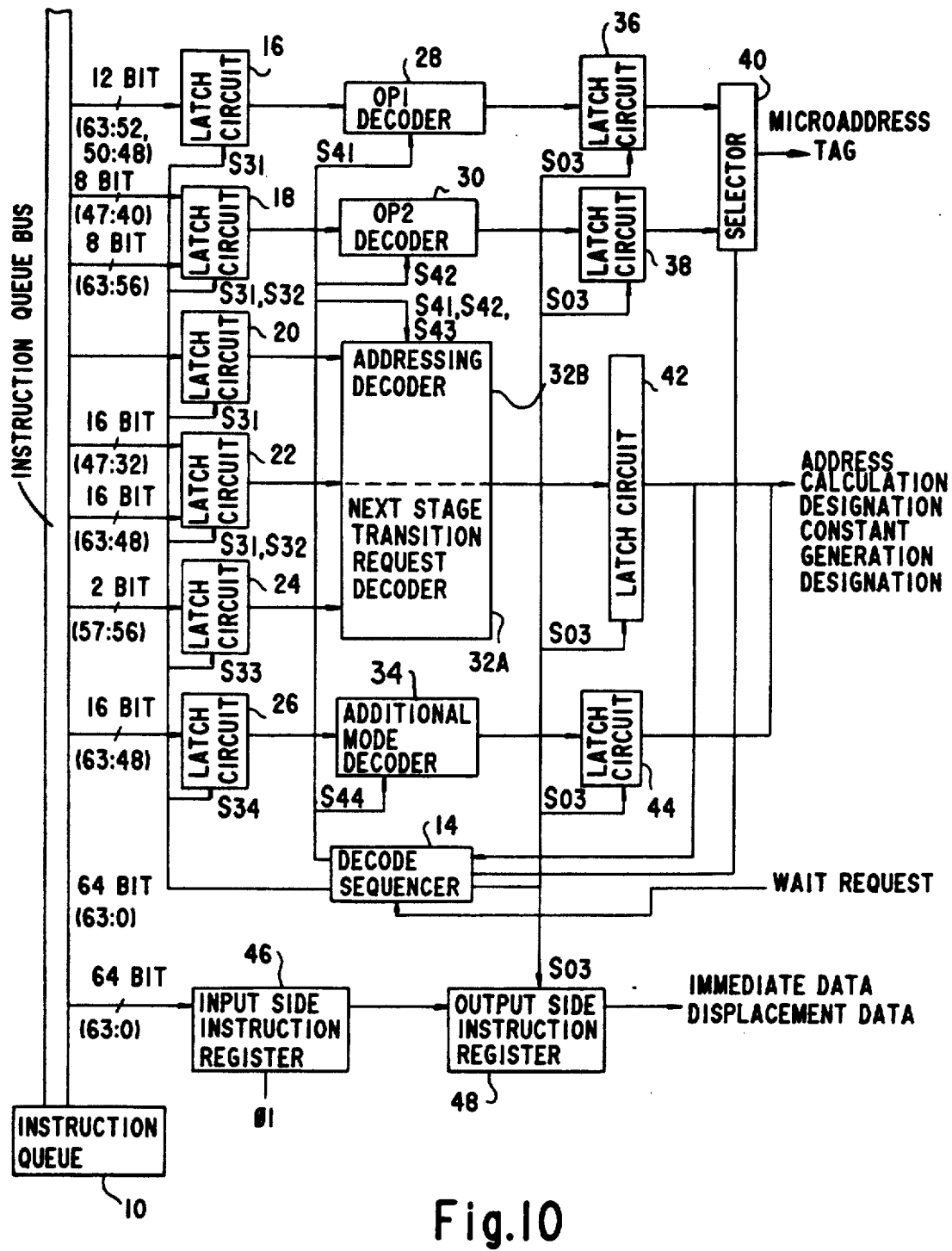
FIG. 10 is a block diagram of an instruction decoder as an embodiment of the present invention.

FIG. 10 is a block diagram of an instruction decoder as an embodiment of the present invention for realizing the stage transition shown in FIG. 7. This instruction decoder takes the instructions supplied from the instruction queue 10 through an instruction queue bus 12 based on the control signal sent from the decode sequencer 14 and decodes such instructions.

Hereinafter, the decoding of the variable length instructions in the format shown in FIG. 2, for example, will be explained. The instruction queue bus 12 has the width of 64 bits and the instruction queue 10 sends the instructions to the instruction queue bus 12 in unit of 64 bits. The data (bit 63 bit 0) on the instruction queue bus 12 is held by the latch circuits 16 26 in the timing based on the control signal sent from the decode sequencer 14. The numerals in the parentheses in the figure indicate the bit number to be input to the corresponding latch circuits. For example, (63:48) indicates that 16 bits among bit 63 bit 48 are input.

The first operation code (OP1) decoder 28, second operation code (OP2) decoder 30, addressing area decoder 23B and the next stage transition request decoder 32A are decoders for decoding the basic area. The additional mode decoder 34 is a decoder for decoding the extensible area. The immediate data, displacement data, etc. are taken through an input side instruction register 46 and an output side instruction register 48. A latch circuit 16 is the 12-bit latch, a latch circuit 18 a 2-input 8-bit latch, a latch circuit 20 is the 16-bit latch, a latch circuit 22 is the 2-input 16-bit latch and a latch circuit 24 is the 2-bit latch.

The first operation code (OP1) decoder 28 decodes, in the SG1 stage, the 12 bits of operation code [(63:52), (50:48)] included in the first basic area taken by the latch circuit 15 at the timing of the latch control signal S31.

The second operation code (OP2) decoder 30 decodes, in the SG1 stage, the 8 bits of operation code (47:40) included in the second basic area taken by the latch circuit 18 at the timing of the latch control signal S31 and also decodes, in the SG2 stage, the 8 bits of operation code (63:56) taken by the latch circuit 18 at the timing of the latch control signal S32.

The next stage transition request decoder 32A and the addressing decoder 32B carry out the decoding with input of the data and S41, S42, S43 of latch circuits 20, 22, 24 26. The next stage transition request decoder 32A identifies the transition request to each stage shown in FIG. 7. The addressing decoder 32B decodes the addressing mode. The latch circuit 20 takes 16 bits (63:48) at the timing of the latch control signal S32 and this data is decoded in the SG1 stage. The latch circuit 22 is a 2-input latch which takes 16 bits (47:32) at the timing of the latch control signal S31 in the SG1 stage and also takes 16 bits (63:48) of the latch control signal in the SG 2 stage. The latch circuit 24 takes, in the SG3 stage, 2 bits (57:56) at the timing of the latch control signal S33.

The additional mode decoder 34 decodes the extensible area of 16 bits (63:48) held by the latch circuit 26 at the timing of the latch control signal S34 in the ADDM stage.

The second operation code (OP2) decoder 28 also carries out the decoding in the SG1 stage because the simultaneous decoding of the first basic area and the second basic area is sometimes conducted. In the instruction of the ordinary type having two or more operands, when the first operand is of the register direct (data in the register is used directly as the operand), the second operation code to be decoded in the SG2 stage exists on the second half word (47:32) on the instruction queue bus 12. The first and second operation codes of the instruction are decoded simultaneously only in this case. Therefore, in the SG1 stage, the latch circuits 18, 22 of the second operation decoder 18 and the addressing decoder 32B take the second half word without any conditions and makes valid the decoding result of the second operation code in case the instruction is of the ordinary type due to the decoding of the first operation code in the OP1 decoder 28 and the first operand is of the register direct type. On the other hand, in case the instruction is of the not ordinary type or is of the ordinary type and the first operand is not of the register direct type, the decoding result of the second operation code is made invalid and the decoding result of the first instruction operation code is made valid. In this case, when the instruction is of the ordinary type and the first operand is not of the register direct type, the SG2 stage transition request is asserted the decoding of the second operation code is carried out in the next cycle (SG2 stage). In this SG2 stage, since the second operation code is in the first half word (63:48) on the instruction queue bus 12, the latch circuits 18, 22 of the second operation code decoder 30 and addressing decoder 32B take the first half word (63:48) on the instruction queue bus 12 and conducts the decoding of the second operation code and second operand.

In this embodiment, as the instructions having the third basic area, there are a fixed bit length bit field instruction and loop instructions such as add compare branch and sub compare branch. These instructions have four operands. The two operands among them are designated by the first operand and second operand designation areas of the ordinary type first and second basic areas, and the third basic area is used for designating the other two operands. The third basic area does not have the operation code for identifying the instruction (a kind of instruction is already designated by the operation code of the first and second basic areas and is already identified at the time of the decoding of the third basic area) but has the register number and immediate data. Therefore, in the SG3 stage, the decoder inputs only the field (57:56) for designating a size of immediate data and outputs an instruction for generating a constant. The register number and immediate data are transmitted to the circuit in the successive stage through the input side instruction register 46 and output side instruction register.

In this embodiment, the extensible area is used for realizing the additional mode addressing. The additional mode addressing allows use of multiple indirect addressing and scaling. The operand address is basically obtained by the following formula and the multiple indirect addressing can also be realized by repeatedly applying such calculations of the address.

[Base address+Index * scale+Displacement]

Therefore, the base address of the first stage is designated by the operand designation area of the basic area and index, scale, displacement are designated by the following format in every stage.

$$^{15}|E\ |I|Rn|M|\ |XX|D4\ |^0EXP$$

E: End designation
I: Indirect designation
Rn: Index register number
M: Index designation
XX: Scale designation
D: Displacement designation
D4: Displacement data (expanded to the field of extensible area EXP in the case of 16 bits and 22 bits)

The additional mode decoder decodes the additional mode addressing designation area by latching the first half word (16:0) on the instruction queue bus 12 in every stage in the ADDM stage.

The decoding result of the operation code decodes 28, 30 is held in the latch circuits 36, 38 at the timing of the latch control signal S03. One of the outputs being held is selected and the microaddress is supplied to the microprogram ROM 65 shown in FIG. 13. A tag is also supplied to the pipeline controller 64. The decoding result of the addressing decoder 32A and next stage transition request decoder 34B is held by the latch circuit 42 at the timing of the latch control signal S03 and the decoding result of the additional mode decoder 34 is held in the latch circuit 44. These data that a held issue the instructions for address calculation and constant generation to the address generator 68 and constant generator 67 forming the instruction executing area 81 of FIG. 13.

Figure 11:
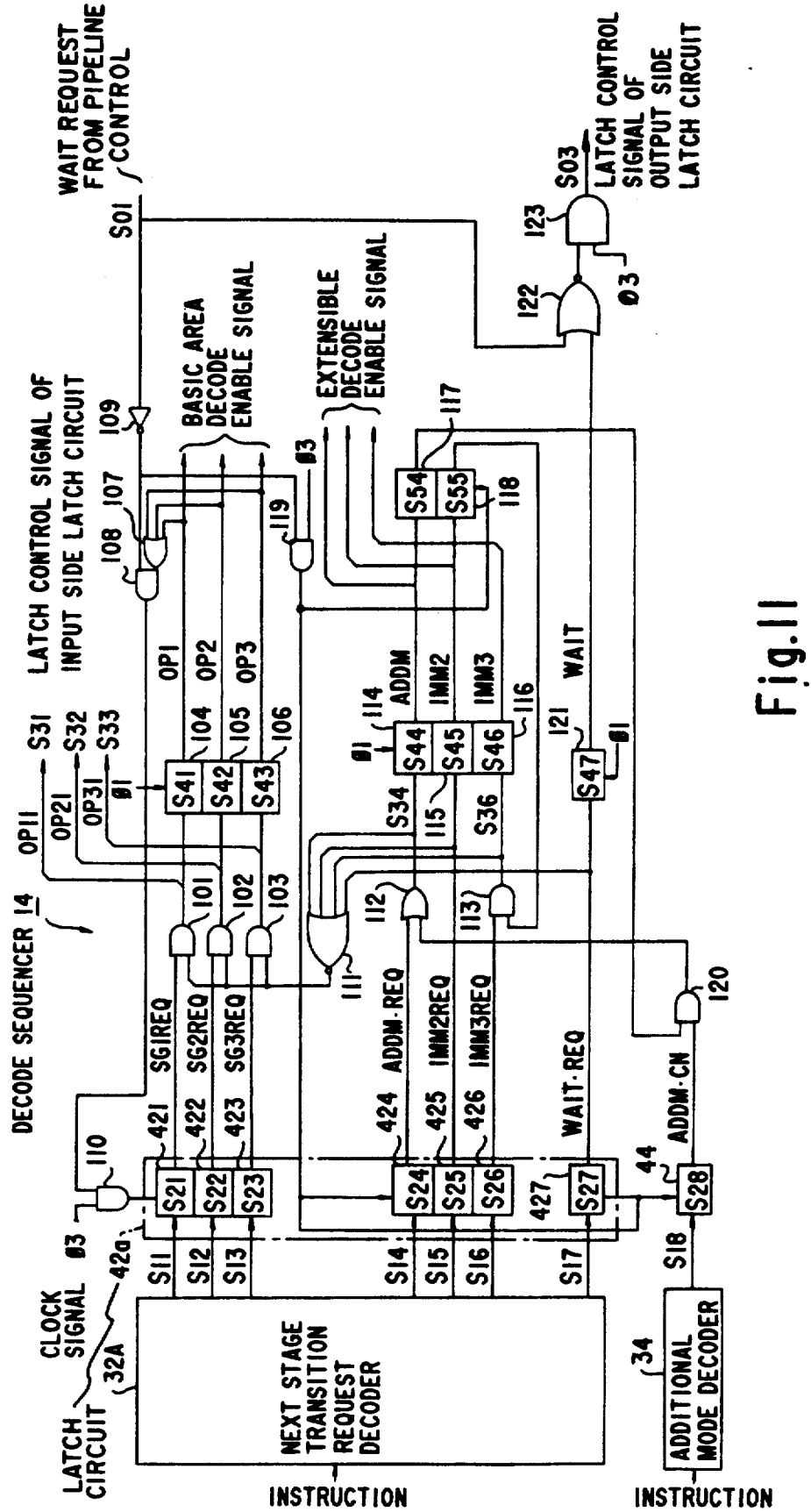
FIG. 11 is a block diagram of decode sequencer as an embodiment of the present invention.

Control of the instruction decoder shown in FIG. 10 is carried out by the decode sequencer 14. FIG. 11 is a block diagram of the decode sequencer 14 as an embodiment of the present invention.

The decode sequencer of this embodiment does not consider existence or not existence of the extensible area in the transition of the basic condition and generates respective control signals so that the basic transition request is frozen while the extensible transition request is asserted. Moreover, since the decoding is carried out over several cycles, the decoders are provided for the decoding corresponding to the first operation code, second operation code and additional mode and since the reference is made, in the successive cycles, to the decode completion signal with each stage signal, the latch circuits are controlled in every divided decoder. Moreover, when the wait request is issued from the wait stage and external circuit, the output side latch is frozen, to keep the present condition.

Details of the decode sequencer of the present embodiment will be explained. The decode sequencer of this embodiment generates the basic transition request signals S11, S12, S13 and extension transition request signals S14, S15, S16 output from the next stage transition request decoder 32A, the extension continuation request signal S18 output from the additional mode decoder 34, the input and output-side latch control signal based on the 4-phase clock signals $\phi_0 \phi_3$ shown in FIG. 12 and the enable signal of each decoder. The latch circuit 42a as a part of the latch circuit 42 temporarily holds the decoded outputs S11 through S17 that are outputted from the next stage transition request decoder 32A. The outputs of bit latch circuits 421 through 423 respectively become the first basic stage transition request signal SG1REQ (S21), second basic stage transition request signal SG2REQ (S22) and the third basic stage transition request signal SG3REQ (S23). The outputs of bit latch circuits 424 through 427 respectively become the additional mode stage transition request signal ADDM REQ (S24), 64-bit immediate transition request signal IMM2REQ (S25), 96-bit immediate transition request signal IMM3REQ (S26) and wait request signal WAIT REQ (S27). The decoded output S18 of the additional mode decoder 34 is temporarily held in the latch circuit 44 and is then output as the additional mode continuation signal ADDM CN (S28). The data held by the bit latch circuits 421~423 are stored respectively in the bit latch circuits 104, 105, 106 at the timing of the clock signal $\phi_1$ through the AND gates 101, 102, 103. The AND gates 101 through 103 are used to mask the basic area transition request while the extensible area transition request exists. The data S41, S42, S43 held in the bit latch circuits 104~106 are input to the OR gate 107 and its logical sum OR output is supplied to the one input terminal of the AND gate 108. The wait request signal WAIT PL ($S_{01}$) sent from the pipeline controller 64 (refer to FIG. 13) is supplied, through the inverter 109, to the other input terminal of the AND gate 108. The OR gate 107 is used to detect that the current stage is in the basic stage area. The AND gate 108 is used to detect that the wait request WAIT PL and the basic area transition request are not issued and generate the signals for taking the outputs S11~S13 of the next stage transition request decoder. The output of AND gate 108 is supplied to the one input terminal of the AND gate 110, while the clock signal $\phi_3$ is applied to the other input terminal of the AND gate 110. The output of AND gate 110 is used as the latch timing signal for the bit latch circuits 421, 422, 423 to take the decoded outputs S11~S13. The output of NOR gate 111 for controlling the mask of the basic area transition request is supplied to the other input of the AND gates 101~103. The outputs of the bit latch circuits 424, 426 are respectively supplied to the input terminals of the NOR gate 111 as the signals S34, S36 through the OR gate 112, and the AND gate 113. The data S25, S27 held in the bit latch circuits 425, 427 are also supplied directly to the input terminals in order to detect the existence or non-existence of the transition request to the extensible area. The data S34, S25, S36 are respectively held in the bit latch circuits 114, 115, 116 at the timing of the clock signal $\phi_1$ and are output as the extensible area decode enable signals ADDM (S44), IMM2(S45) and IMM3(S46). The data S44, S45 are respectively held as the data S54, S55 in the bit latch circuits 117, 118. The data S54 is supplied to the one input terminal of the AND gate 120, while the data S55 is supplied to the other input terminal of the AND gate 113. The AND gate 113 is used to transfer IMM3REQ to the bit latch circuit 116 when this signal exists in the IMM2 stage. The AND gate 120 detects, as a result of the decoding of the extensible area in the extension mode, that the extension mode further continues and transfers ADDM REQ to the bit latch circuit 114. Both the output of the inverter 109 and the clock signal $\phi_3$ are supplied to the AND gate 119 and an output of the AND gate 119 is used as the timing signal for taking the decode outputs S14 through S17 to the bit latch circuits 117, 118. The output of the AND gate 119 is also used by bit latch circuit 424 through 427 as the latch timing signal.

The decode output S18 from the additional mode decoder 34 is held in the latch circuit 44 at the timing of the output of AND gate 119 and is then supplied to the other input terminal of the AND gate 120 as the additional mode continuation signal ADDM CN (S28). The wait request signal WAIT REQ (S27) is held in the bit latch circuit 121 at the timing of the clock signal $\phi_1$ and is then supplied to the NOR gate 122 as the wait signal WAIT (S47). The NOR gate 122 is used to detect the existence or non-existence of the WAIT or WAIT PL. An output of the NOR gate 122 and clock signal $\phi_2$ are supplied to the AND gate 123 and when the wait request is not issued, the latch control signal S03 is output from the AND gate 123. This latch control signal S03 is used as the latch timing signal of the latch circuits 36, 38, 44, 48 shown in FIG. 10. An output of the AND gate 101 is supplied as the latch control signal OP11 (S31) for enabling the latch circuits 16 through 20 shown in FIG. 10. An output of the AND gate 102 is supplied as the latch control signal OP21 (S32) to enable the latch circuits 18, 22 shown in FIG. 10. An output of the AND gate 103 is supplied as the latch control signal OP31 (S33) to enable the latch circuit 24 shown in FIG. 10. The data S41 held in the bit latch circuit 104 is supplied as the first basic area decode enable signal OP1 to the OP1 decoder 28 and addressing decoder 32B shown in FIG. 10. The data S42 held in the bit latch circuit 105 is supplied as the second basic area decode enable signal OP2 to the OP2 decoder 30p and addressing decoder 32B shown in FIG. 10. The data S43 held in the bit latch circuit 106 is supplied as the third basic area decode enable signal OP3 to the addressing decoder 32B shown in FIG. 10. Each decoder starts the decoding responding to the decode enable signals OP1 through OP3. Moreover, the data S44, S45, S46 held in the bit latch circuits 114 through 116 respectively become the extensible area decode enable signals ADDM, IMM2, IMM3. These signals are supplied to the additional mode decoder 34 shown in FIG. 10 as the extensible area decode enable signal ADDM to designate the start of the decoding of the extensible area. The data S45, S46 are held in the latch circuit 44 as the decode enable signal for designating immediate decoding of 64 bits and 96 bits and this data held gives designation to generate a constant to the constant generator.

Figure 12:
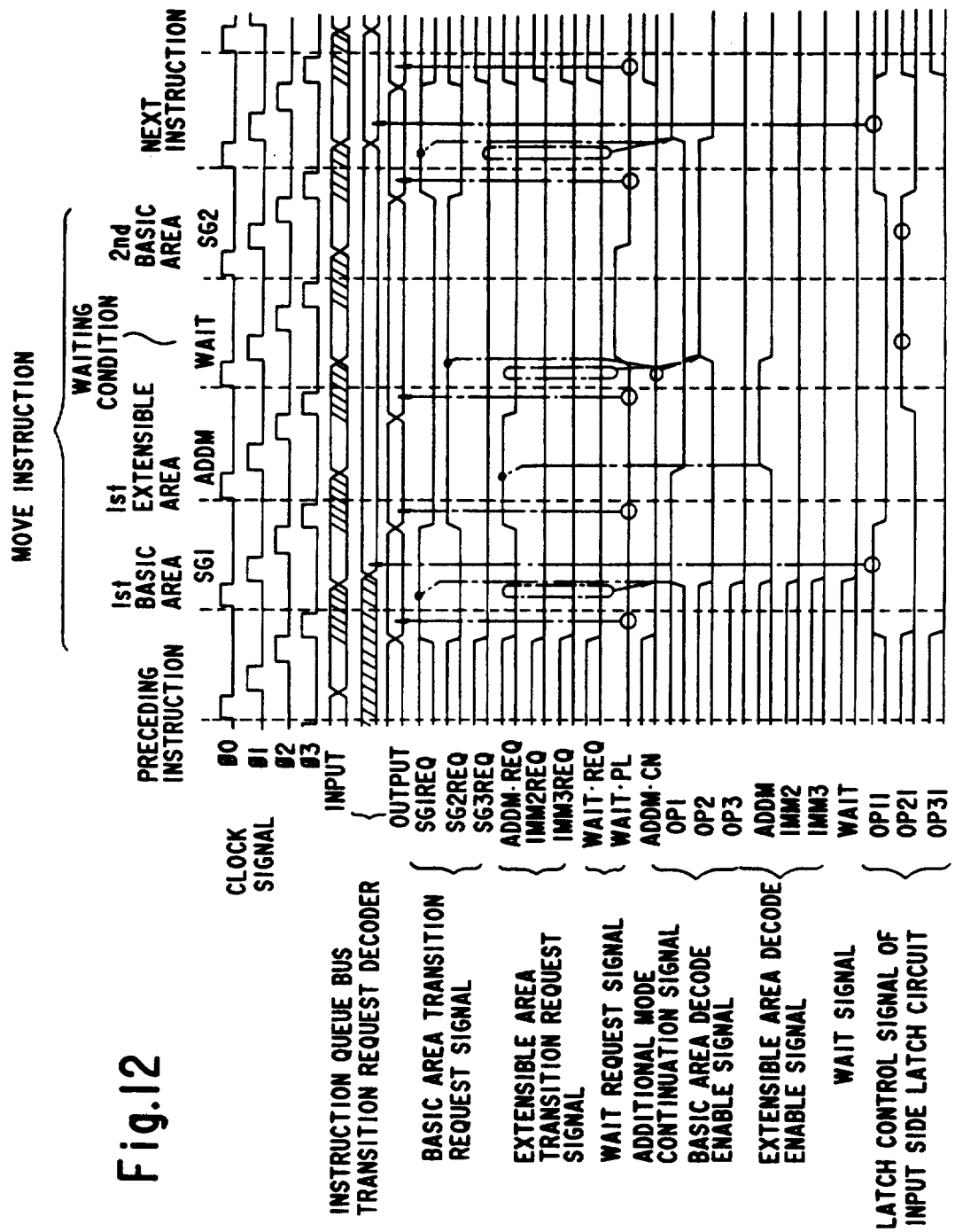
FIG. 12 is a timing chart for explaining the operations of the decode sequencer shown in FIG. 11.

As an example, the operation timing during the decoding of the memory-to-memory transfer instruction MOV shown in FIG. 8 is shown in FIG. 12. In FIG. 12, the elements like those in FIG. 11 are designated with like reference numerals.

After the end of processing of the preceding instruction, the first basic area transition request signal SG1REQ (S21) becomes "1" at the rising time of the clock signal $\phi_3$. In this case, the second basic area transition request signal SG2REQ (S22), third basic area transition request signal SG3REQ (S23), extensible area transition request signal ADDMREQ (S24), IMM2REQ (S25), IMM3REQ (S26), wait request signal WAIT REQ (S27) and additional mode continuation signal ADDM CN (S28) all become "0". Therefore, since an output of the NOR gate 111 is "1", the latch control signal OP11 (S31) is "1", OP21 (S32) and OP31 (S33) are "0", the latch circuits 16, 18, 20, 22 take the corresponding data on the instruction queue bus 12. The first basic area decode enable signal OP1 (S41) becomes "1" at the rise time of the next clock signal $\phi_1$ and the first basic area is decoded. In this timing, the second basic area decode enable signal OP2 (S42) and third basic area decode enable signal (S43) are "0", indicating the disable condition.

The first basic area transition request signal SG1REQ (S21) is "0", and both the second basic area transition request signal SG2REQ (S22) and extensible area transition request signal ADDM REQ (S24) are "1" at the rise time of the next clock signal $\phi_3$. However, since an output of the NOR gate 111 is "0", the second basic area transition request signal SG2REQ (S22) is masked by the AND gate 102 and the extensible area transition request signal ADDM REQ (S24) is preferentially processed. Accordingly, at the rise time of the next clock signal $\phi_1$, the second basic area decode enable signal OP2 (S42) is "0" and in the disable condition, the extensible area transition request signal ADDM REQ (S24) is taken by the bit latch circuit 44, the extensible area decode enable signal ADDM (S44) becomes "1" and the first extensible area (additional mode) is decoded.

The extensible area transition request signal ADDM REQ (S24) becomes "0" at the rise time of the next clock signal $\phi_3$. In this case, since the additional mode continuation signal ADDM CN (S28) is "0" indicating that the successive extensible area does not exist, the end of additional mode stage is designated. Responding to the end of the additional mode stage, the NOR gate 111 becomes "1", resetting the masking by the AND gates 101 through 103. As a result, the latch control signal OP21 (S32) becomes "1" and the data on the instruction queue bus 12 is taken by the latch circuits 18, 22. At the rise time of the next clock signal $\phi_1$, the data "1" of the second basic area transition request signal SG2REQ (S22) is taken by the bit latch circuit 105, the second basic area decode enable signal OP2 (S42) becomes "1" and the second basic area is decoded. However, the wait request signal WAIT PL (S01) from the pipeline controller becomes "1" indicating that the wait request is issued. Accordingly, an output of the NOR gate 122 is "0", the output side latch circuit control signal (S03) output from the AND gate 123 is fixed to "0" irrespective of the clock signal $\phi_3$, and even when the next clock signal $\phi_3$ rises, the result of decoding of the second basic area is not taken into the latch circuit 38. In the same way, since the AND gate 110, 119 are closed responding to the wait request, new data is not taken into the bit latch circuit 42a. Therefore, the decode sequencer does not change the condition during one cycle and is in the queuing condition.

Figure 13:
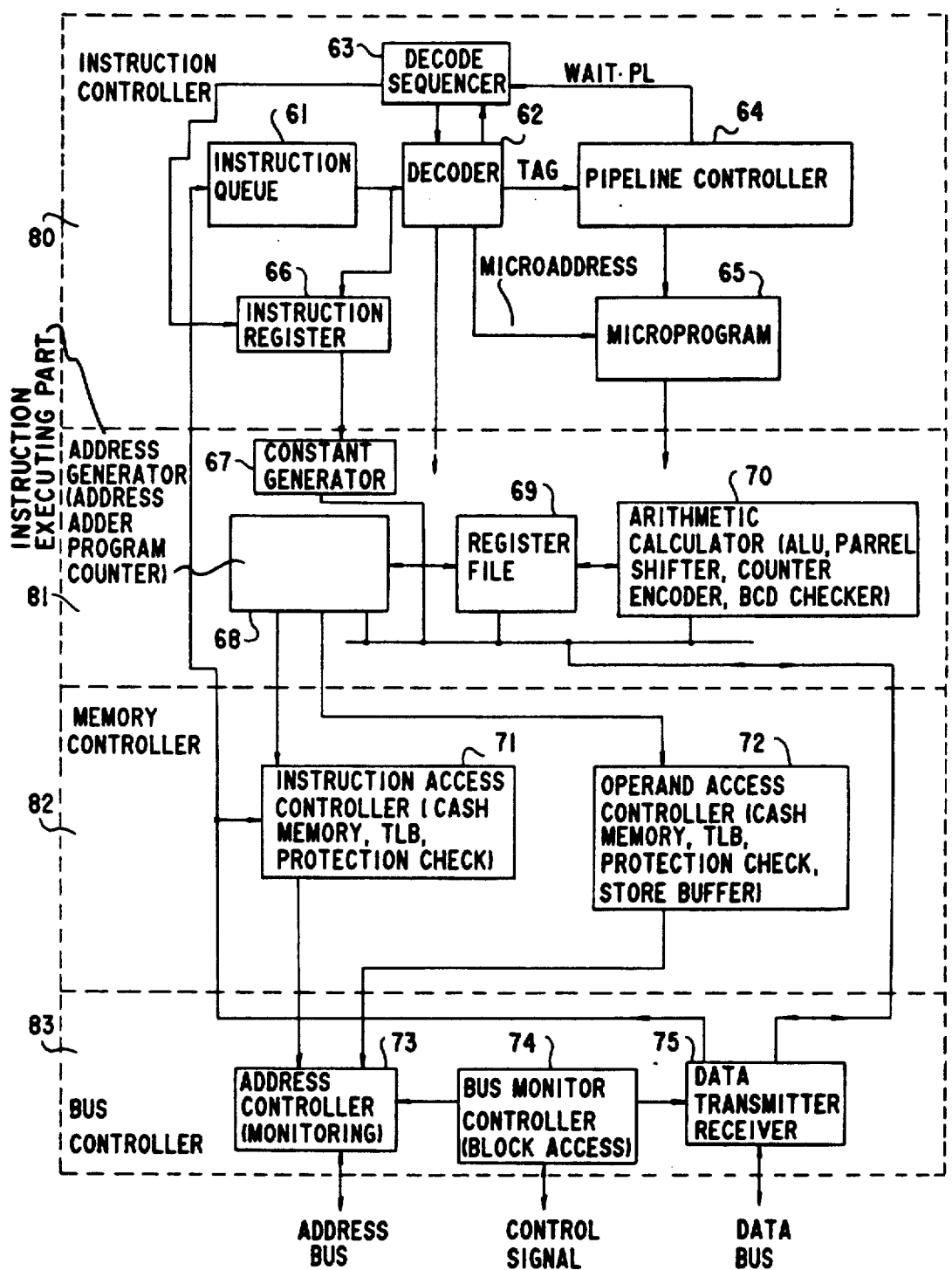
FIG. 13 is a block diagram of a microprocessor as an embodiment of the present invention.

At the rise time of the next clock signal $\phi_1$, the wait request signal WAIT PL (S01) becomes "0", resetting the queuing condition. At the rise time of the next clock signal $\phi_3$, the latch control signal (S03) becomes "1". Therefore, the decoding result of the second basic area decoded in the preceding cycle is taken into the latch circuit 38. In this case, the first basic area transition request signal SG1REQ (S21) and latch control signal OP11 (S31) become "1", while the second basic area transition request signal SG2REQ (S22) and latch control signal OP21(S32) become "0". In this timing, the decode process of the MOVE instruction completes. In the next cycle, the decode process of the next instruction is started. FIG. 13 is a block diagram indicating a structure of the microprocessor as an embodiment of the present invention. The microprocessor is formed as a monolithic LSI comprising an instruction controller 80 for controlling the pipeline and decoding instructions, an instruction executing area 81 for executing instructions, a memory controller 82 for controlling a built-in cache memory, etc. and a bus controller 83 for controlling transmission and reception of information to/from the external circuits of the LSI chip. The instruction controller 80 comprises an instruction queue 61, an instruction decoder 62 having the structure shown in FIG. 11 and FIG. 12, a decode sequencer 63, a pipeline controller 64, a microprogram ROM 65 for storing the microcode and outputting the control signal based on the microaddress and an instruction register 66. The instruction executing part 82 comprises a constant generator 67, an address generator 68 including an address adder and a program counter, a register file 70 and an arithmetic calculator 70. The arithmetic calculator 70 comprises an ALU, a barrel shifter, an encoder and a BCD checker. The memory controller 82 comprises an instruction access controller 71 and an operand access controller 72. The instruction access controller 71 comprises a cache memory for instructions, TLB and a protection check circuit. The operand access controller 72 comprises a cache memory for the operand, a TLB, a protection check circuit and a store buffer. A bus controller 83 comprises an address controller 73 having an interface function with the external LSI chip and including an address monitoring circuit, a bus monitoring controller for generating a control signal for block access and a data transmitter/receiver 75. It is natural that the decoder and decode sequencer of the present invention can be applied to the microprocessor including that shown in FIG. 13.

APPLICATION FIELD IN INDUSTRY

As explained previously, according to the microprocessor of the present invention, a structure of the decode sequencer can be simplified by identifying the existence or non-existence of the successive basic areas and extensible areas after sequentially reading the instruction from the leading area, temporarily storing the result of the identification into the memory circuit and conducting the control to preferentially start the decoding of the extensible area while holding the decoding start request of the basic area in case the decode start request of the successive basic area competes with the decode start request of the extensible area. Moreover, a simplified structure of the decode sequencer has improved the processing speed and is suitable for the realization of an integrated circuit.

What is claimed is:

1. A microprocessor for executing variable length instructions including the basic area including an instruction code and an operand designation area and an extensible area to be added depending on the designation of said basic area to expand said operand designation area, comprising:
   a basic area decoder means for identifying existence or non-existence of successive basic areas and extensible areas, and for outputting a basic area transition request or extensible area transition request by decoding said basic area;
   an extensible area decoder means for identifying existence or non-existence of successive extensible areas, and for outputting an extensible area continuation request by decoding said extensible area; and
   a decode sequencer means for generating a control signal to enable the decoding to said basic area decoder means and extensible area decoder means in accordance with the predetermined sequence, wherein
   said decode sequence means comprises a first control circuit for generating a control signal for said basic area decoder means responding to said basic area transition request, a second control circuit for generating a control signal for said extensible area decoder means responding to said extensible area transition request or extensible area continuation request, and a third control circuit connected to said first control circuit and said second control circuit to temporarily disable the operations of the first control circuit corresponding to said basic area transition request in case said extensible area transition request or extensible area continuation request is issued.

2. A microprocessor according to claim 1, further comprising:
   an instruction bus for supplying instructions;
   a first input latch circuit connected between said basic area decoder means and said instruction bus;
   a first output latch circuit for holding an output of said basic area decoder means; and
   a second output latch circuit connected between said extensible area decoder means and said instruction bus;
   wherein the input taking operations of said first, second input latch circuits and first, second output latch circuits are controlled by said decoder sequencer means.

3. A microprocessor according to claim 1, wherein said basic area decoder means comprises an operation code decoder for decoding operation codes, an addressing decoder for decoding addressing modes and a next stage transition request decoder for identifying existence or non-existence of successive basic areas or extensible areas.

4. A microprocessor according to claim 3, wherein said operation code decoder means comprises a first operation code decoder for decoding the operation code of the first basic area and a second operation code decoder for decoding the operation code of the second basic area.

5. A microprocessor according to claim 4, wherein said first operation code and second operation code are decoded simultaneously.

6. A microprocessor according to claim 1, wherein said microprocessor further comprises an instruction register means for taking the data of said instruction under the control of said decoder means.

7. A microprocessor according to claim 1, wherein said first control circuit comprises a first latch circuit for holding said basic area transition request, a second latch circuit for holding an output of said first latch circuit to output as the basic area decode enable signal and a first gate circuit connected between said first latch circuit and second latch circuit, and said second control circuit comprises a third latch circuit for holding said extensible area transition request, a fourth latch circuit for holding an output of said third latch circuit to output an extensible area decode enable signal and a second gate circuit for receiving an output of said third latch circuit and inhibits transfer of an output of said first latch circuit to said second latch circuit by controlling said first gate circuit in case said extensible area transition request or said extensible area continuation request is issued.

8. A microprocessor according to claim 2, wherein said decode sequencer means comprises a third gate circuit to inhibit change of condition of said first and second output latch circuits depending on the wait request.

9. A microprocessor for executing variable length instructions including the basic area including an instruction code and an operand designation area and an extensible area to be added depending on the designation of said basic area to expand said operand designation area, comprising:

a basic area decoder means for identifying existence or non-existence of successive basic areas and extensible areas, and for outputting a basic transition request or extensible area transition request by decoding said basic area, said basic area decoder means including an operation code decoder for decoding operation codes, an addressing decoder for decoding addressing modes and a next stage transition request decoder for identifying existence or non-existence of successive basic areas or extensible areas;

an extensible area decoder means for identifying existence or non-existence of successive extensible areas, and for outputting an extensible area continuation request by decoding said extensible area; and a decode sequencer means for generating a control signal to enable the decoding to said basic area decoder means and extensible area decoder means in accordance with the predetermined sequence, wherein said decode sequence means comprising a first control circuit for generating a control signal for said basic area decoder means responding to said basic area transition request, a second control circuit for generating a control signal for said extensible area decoder means responding to said extensible area transition request or extensible area continuation request, and a third control circuit connected to said first control circuit and said second control circuit to temporarily disable the operations of the first control circuit corresponding to said basic area transition request in case said extensible area transition request or extensible area continuation request is issued.

* * * * *